United States Patent
Kniesburges

(10) Patent No.: US 9,469,547 B2
(45) Date of Patent: Oct. 18, 2016

(54) INTEGRATED CARBON DIOXIDE REMOVAL AND AMMONIA-SODA PROCESS

(71) Applicant: ALSTOM Technology Ltd, Baden (CH)

(72) Inventor: Peter Kniesburges, Weisbaden (DE)

(73) Assignee: ALSTOM Technology Ltd, Baden (CH)

(*) Notice: Subject to any disclaimer, the term of this patent is extended or adjusted under 35 U.S.C. 154(b) by 0 days.

(21) Appl. No.: 14/157,051

(22) Filed: Jan. 16, 2014

(65) Prior Publication Data
US 2014/0199228 A1     Jul. 17, 2014

(30) Foreign Application Priority Data
Jan. 17, 2013  (EP) .................................. 13151691

(51) Int. Cl.
| | | |
|---|---|---|
| *C01D 7/16* | (2006.01) | |
| *B01D 53/14* | (2006.01) | |
| *C01D 7/18* | (2006.01) | |
| *B01D 53/62* | (2006.01) | |

(52) U.S. Cl.
CPC .............. *C01D 7/16* (2013.01); *B01D 53/1418* (2013.01); *B01D 53/1475* (2013.01); *B01D 53/62* (2013.01); *C01D 7/18* (2013.01); *B01D 2251/304* (2013.01); *B01D 2252/102* (2013.01); *B01D 2258/0283* (2013.01); *Y02C 10/04* (2013.01); *Y02C 10/06* (2013.01); *Y02P 20/152* (2015.11)

(58) Field of Classification Search
CPC .......... B01D 53/1475; B01D 53/1418; B01D 53/62; B01D 2258/0283; B01D 2251/304; B01D 2252/102; C01D 7/18; C01D 7/16; Y02C 10/06; Y02C 10/04
USPC .......................................... 423/427
See application file for complete search history.

(56) References Cited

U.S. PATENT DOCUMENTS

| | | | |
|---|---|---|---|
| 518,429 | A | 4/1894 | Solvay |
| 1,423,510 | A | 7/1922 | Arnold et al. |
| 1,924,503 | A | 8/1933 | Lambert |
| 2,946,653 | A | 7/1960 | Myers |
| 3,212,848 | A | 10/1965 | Tasiaux |
| 3,368,866 | A * | 2/1968 | Pierre Seguela ............. 423/429 |
| 7,056,482 | B2 | 6/2006 | Hakka et al. |

(Continued)

FOREIGN PATENT DOCUMENTS

| | | |
|---|---|---|
| CN | 1046142 A | 10/1990 |
| CN | 102531001 A | 7/2012 |

(Continued)

OTHER PUBLICATIONS

Partial IN 131326.*

(Continued)

*Primary Examiner* — Daniel C McCracken
(74) *Attorney, Agent, or Firm* — Cynthia W. Flanigan

(57) ABSTRACT

The present invention relates to an method for producing sodium carbonate by integration of a carbon dioxide capture process with an ammonia-soda process. The present invention moreover relates to a plant for producing sodium carbonate comprising a carbon dioxide capture system and an ammonia-soda system. Uses of fluid streams generated in a carbon dioxide capture process in an ammonia-soda process is moreover disclosed.

4 Claims, 4 Drawing Sheets

(56) References Cited

U.S. PATENT DOCUMENTS

| | | |
|---|---|---|
| 8,105,419 B2 | 1/2012 | Neumann et al. |
| 8,137,444 B2 | 3/2012 | Farsad et al. |
| 2008/0072762 A1* | 3/2008 | Gal ................................ 96/242 |
| 2008/0245274 A1 | 10/2008 | Ramme |
| 2010/0196244 A1 | 8/2010 | Grauer et al. |
| 2010/0329963 A1 | 12/2010 | Sceats et al. |
| 2011/0033355 A1 | 2/2011 | Smith |
| 2011/0052453 A1 | 3/2011 | McLarnon et al. |
| 2011/0265512 A1 | 11/2011 | Bearden et al. |
| 2012/0258031 A1 | 10/2012 | Guidolin et al. |

FOREIGN PATENT DOCUMENTS

| | | |
|---|---|---|
| DE | 42 12 038 | 10/1993 |
| JP | 2011-162404 | 8/2011 |
| WO | 2006/022885 | 3/2006 |
| WO | 2009/091437 | 7/2009 |
| WO | 2012/006678 | 1/2012 |

OTHER PUBLICATIONS

Lipinsky, "*R&D Status of Technologies for Utilization of Carbon Dioxide*", Energy Conversion Management, vol. 33, No. 5-8, pp. 505-512, 1992.

* cited by examiner

INTEGRATED CARBON DIOXIDE REMOVAL AND AMMONIA-SODA PROCESS

CROSS-REFERENCE TO RELATED APPLICATIONS

This application claims priority to European application 13151691.6 filed Jan. 17, 2013, the contents of which are hereby incorporated in its entirety.

TECHNICAL FIELD

The present invention relates to methods and systems for removal of carbon dioxide from process gas streams and for utilization of the removed carbon dioxide in ammonia-soda processes for production of soda ash.

BACKGROUND

When a fuel, e.g. coal, oil, peat and waste, is combusted in a combustion plant, e.g. a power plant, a hot process gas is generated. Such a hot process gas, often referred to as a flue gas, contains, among other components, carbon dioxide ($CO_2$). Release of components such as carbon dioxide to the atmosphere has negative effects on the environment. These negative environmental effects have been widely recognized, and have resulted in the development of processes adapted for removing carbon dioxide from the hot process gas generated in the combustion of the above mentioned fuels.

WO 2006/022885 relates to a process for absorbing carbon dioxide from a flue gas. The process comprises treatment of the flue gas by means of conventional air pollution control processes, such as by means of particulate collectors, NOx and $SO_2$ control, acid mist capturing devices etc. Following conventional air pollution control processes, the flue gas has a temperature of about 40-70° C. The flue gas is subsequently cooled down to, preferably, 5-25° C. by means of direct contact cooling, wherein the flue gas is cooled by means of cold water. Following cooling, the flue gas is brought to a $CO_2$ absorber, in which the flue gas is brought into contact with a low temperature ammoniated solution having a low carbon dioxide content. The carbon dioxide of the flue gas is absorbed into the ammoniated solution, and a clean flue gas, containing very small amounts of pollutants and carbon dioxide, leaves the $CO_2$ absorber. The carbon dioxide rich ammoniated solution is regenerated in a regenerator, in which the carbon dioxide is desorbed, at a temperature of about 120-200° C. and under high pressure between 8-25 bar, to form a concentrated carbon dioxide rich stream. This carbon dioxide rich gas stream is, after being compressed, generally sent to storage.

SUMMARY

Objects of the present invention are to provide improved utilization of carbon dioxide captured in carbon dioxide capture processes, a reduction in capital expenses for carbon dioxide capture processes as well as improved production of sodium carbonate. These objects are achieved, in a first aspect, by means of method for producing sodium carbonate, comprising integrating a carbon dioxide capture process with an ammonia-soda process, wherein the carbon dioxide capture process comprises the steps of:
providing a process gas stream containing carbon dioxide;
removing carbon dioxide from the process gas stream by bringing the process gas stream into contact with an ammoniated solution to allow absorption of the carbon dioxide into the ammoniated solution to generate a solution enriched with carbon dioxide and a gas stream depleted in carbon dioxide and enriched in ammonia, and
removing carbon dioxide from the solution enriched with carbon dioxide by desorption to generate a carbon dioxide rich gas,
and the ammonia-soda process comprises the step of:
reacting the carbon dioxide rich gas stream directly derived from the carbon dioxide capture process with an ammoniated brine solution to generate sodium bicarbonate, and converting the sodium bicarbonate to sodium carbonate.

In the first step of the carbon dioxide capture process, or the carbon dioxide capture section of the present method, a process gas stream such as a flue gas or a natural gas stream containing carbon dioxide is provided. In the next step, the major part of the carbon dioxide content of the process gas stream is removed from the process gas stream. Carbon dioxide removal is accomplished by absorption of carbon dioxide into an ammoniated solution, generating a solution enriched with carbon dioxide and a gas stream depleted in carbon dioxide, and optionally enriched in ammonia. Subsequently, the major part of the carbon dioxide content is removed from the solution enriched with carbon dioxide. Carbon dioxide removal is accomplished by desorption of carbon dioxide from the solution, thus generating a carbon dioxide rich gas of high purity. The carbon dioxide content of this high purity carbon dioxide rich gas may be more than 99.5% (by volume). The resulting carbon dioxide rich gas is directly forwarded to the ammonia-soda process, wherein it is contacted with ammoniated brine to generate sodium bicarbonate. This sodium bicarbonate is further converted into sodium carbonate.

The integrated method provides beneficial effects such as reduced power demand for e.g. compressor operations, since the carbon dioxide rich gas is directly forwarded to ammonia-soda process without first being compressed. A reduction in the total energy demand is consequently thus achieved. Alternatively, the production of sodium carbonate may be further boosted by the additional supply of carbon dioxide gas from the carbon dioxide capture section of the process.

Moreover, using the carbon dioxide rich gas generated in the carbon dioxide capture process when producing sodium carbonate in an ammonia-soda process may positively effect the properties of the sodium carbonate. It is hypothesized that the quality of the sodium carbonate thus produced may be improved.

The process gas stream provided to the method initially contains no ammonia. It may however become enriched in ammonia upon contacting with the ammoniated solution. In one embodiment, the ammonia-soda process further comprises the step of scrubbing the gas stream depleted in carbon dioxide and enriched in ammonia derived directly from the carbon dioxide removal step, to generate a gas depleted in ammonia. Having eliminated a major part of any environmentally harmful constituents there from, the gas stream depleted in both carbon dioxide and ammonia may thereafter be released to the atmosphere. The gas stream depleted in carbon dioxide and enriched in ammonia may be treated, i.e. scrubbed, along with other ammonia rich gases resulting from the ammonia-soda section of the method. Such a scrubbing step may take place in an ammonia scrubber of the ammonia-soda process.

Usually, carbon dioxide capture processes for removal of carbon dioxide from a process gas require operations for water wash, wash water stripping and heating. The present method however eliminates the need for such operations by directly forwarding the gas stream depleted in carbon dioxide and enriched in ammonia to the ammonia-soda process, or the ammonia-soda section of the present method. Both water wash and stripping thus become superfluous and may as such be excluded from the integrated method. Any required treatment of the gas stream depleted in carbon dioxide and enriched in ammonia is provided for by the ammonia-soda part of the present method. Further reductions in capital expenses may consequently be achieved. The energy demand of the inventive method may moreover also be significantly decreased.

In one embodiment, the process gas stream consists at least partially of diluted carbon dioxide process gas generated in the ammonia-soda process. This thus reduces or completely eliminates the carbon dioxide emissions from the ammonia-soda process. The diluted carbon dioxide process gas may be generated in a limestone kiln. In such a limestone kiln, limestone may be converted to calcium oxide and a carbon dioxide lean gas.

In one embodiment, the carbon dioxide capture process further comprises the step of utilizing a fluid containing ammonia generated in an ammonia-soda process as make-up ammonia. This advantageously essentially eliminates any need for adding make-up ammonia to the carbon dioxide capture process via a dedicated storage and dosing system, since essentially all ammonia needed may be provided from the ammonia-soda process. Such make-up ammonia may for example be generated in an ammonia stripper of the ammonia-soda process, e.g. as a gas or a liquid that is sufficiently enriched in ammonia.

It should be understood that advantages, embodiments and examples disclosed in connection with a particular aspect of the present invention is equally relevant, where applicable, to other aspects of the present invention.

There is, in a further aspect, provided a plant for producing sodium carbonate by integration of a carbon dioxide capture system and an ammonia-soda system; the plant comprising a carbon dioxide capture system and an integration circuit, wherein the carbon capture system comprises:

an absorber configured to receive a process gas stream containing carbon dioxide and to remove carbon dioxide from the process gas stream by bringing the process gas stream into contact with an ammoniated solution to allow absorption of the carbon dioxide into the ammoniated solution, to generate a solution enriched with carbon dioxide and a gas stream depleted in carbon dioxide and enriched in ammonia;

a regenerator configured to remove carbon dioxide from the solution enriched with carbon dioxide by desorption to generate a carbon dioxide rich gas, and the integration circuit comprises a duct configured to forward the carbon dioxide rich gas directly from the regenerator of the carbon dioxide cleaning system to the ammonia-soda system for use in production of sodium carbonate.

The plant thus provides an integration of a carbon dioxide capture system and an ammonia-soda system. The carbon dioxide capture system is configured to remove carbon dioxide from a process gas and to provide a high purity carbon dioxide rich gas stream that may be utilized in the ammonia-soda system. The ammonia-soda system is configured to produce sodium carbonate. The integration of the systems is provided by an integration circuit, being configured to allow passage of fluid between the ammonia-soda plant and the carbon dioxide capture system.

In similarity with the above described method, the plant provides beneficial effects such as reduced power demand for e.g. compressor operations. Alternatively, the production of sodium carbonate in the ammonia-soda system may be further boosted by the supply via the integration circuit of high purity carbon dioxide gas from the carbon dioxide capture system.

The above defined plant may for example be used for carrying out the method according to the first aspect.

In one embodiment, the integration circuit further comprises a duct configured to forward the gas stream depleted in carbon dioxide and enriched in ammonia directly from the absorber of the carbon dioxide capture system to the ammonia-soda system, such as to an ammonia scrubber of the ammonia-soda system.

In one embodiment, the integration circuit further comprises a duct configured to forward a diluted carbon dioxide process gas from the ammonia-soda system, such as from a limestone kiln of the ammonia-soda system, to the absorber of the carbon dioxide capture system.

In one embodiment, the integration circuit moreover comprises a pipe configured to forward a fluid containing ammonia from the ammonia-soda system, such as from an ammonia stripper of the ammonia-soda system, to the absorber of the carbon dioxide capture system. The fluid containing ammonia may be a gas or a liquid that is sufficiently rich in ammonia.

There is, in a third aspect, provided a use of carbon dioxide removed from a process gas in a carbon dioxide capture process, or system, for production of sodium carbonate in an ammonia-soda process, or system. This provides further utilization of carbon dioxide removed from a process gas at the same time as the production and/or the quality of sodium carbonate may be increased.

In one embodiment of the above mentioned use, the process gas consists at least partially of a diluted carbon dioxide process gas generated in the ammonia-soda process. For example, excess diluted carbon dioxide process gas generated in the ammonia-soda process may be passed to the carbon dioxide capture process where it partially or completely replaces any process gas provided from external sources.

In one embodiment, the carbon dioxide has been removed from the process gas by absorption into and subsequent desorption from an ammoniated solution to generate a carbon dioxide rich gas stream. The thus removed carbon dioxide has high pressure and a high carbon dioxide content, which reduces the demand of compression operations and thus overall power demand of the processes.

In one embodiment, the process gas remaining after carbon dioxide removal in the carbon dioxide capture process is depleted in carbon dioxide and enriched in ammonia, wherein the process gas is scrubbed in the ammonia-soda process to generate a gas depleted in ammonia. The process gas depleted in carbon dioxide and enriched in ammonia may for example be treated along with any gases containing ammonia resulting from the ammonia-soda process, for example by scrubbing within the ammonia-soda process. No separate water wash, stripping or heating of the gas needs to be performed in the carbon dioxide capture process and the scrubbed gas may be released to the atmosphere.

In one embodiment, a fluid containing ammonia generated in the ammonia-soda process is used as make-up ammonia in the carbon dioxide capture process. This advantageously essentially eliminates the need for adding make-up ammonia from external sources to the carbon dioxide capture process.

Further objects and features of the present invention will be apparent from the description and the claims.

BRIEF DESCRIPTION OF THE FIGURES

Referring now to the Figures, which are exemplary embodiments, wherein.

DETAILED DESCRIPTION

Figure 1:
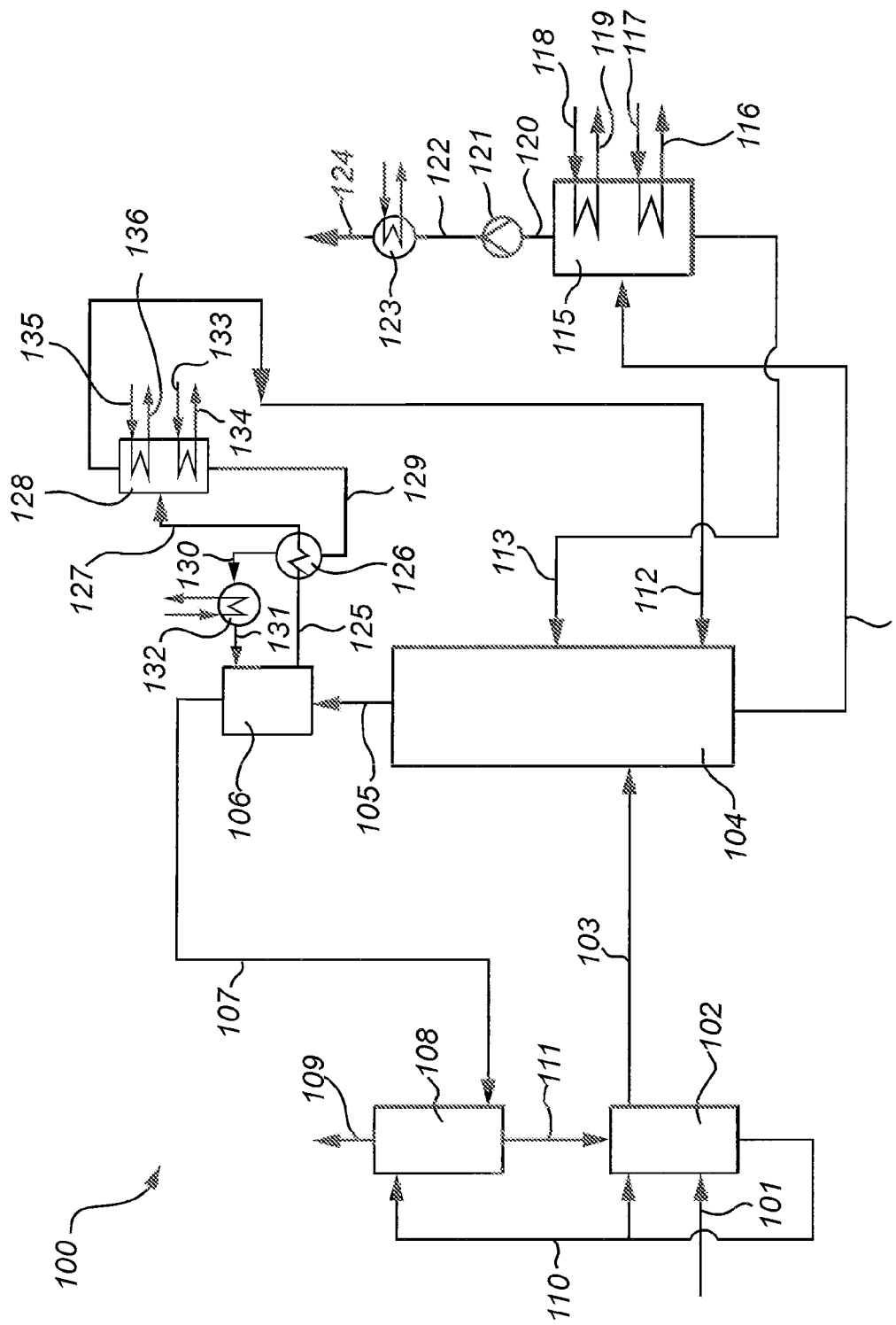
FIG. 1 is schematic representation of a carbon dioxide capture system for removal of carbon dioxide from process gas according to prior art.

The process gas provided to the present method and plant may be any type of process gas containing carbon dioxide, such as flue gas from any combustion device such as furnaces, process heaters, incinerators, package boilers, power plant boilers, as well as a process gas from a limestone kiln.

The removal of carbon dioxide, $CO_2$, from the process gas by the ammoniated solution may be achieved by the ammoniated solution absorbing or dissolving the $CO_2$ in any form, such as in the form of dissolved molecular $CO_2$, carbonate or bicarbonate. $CO_2$ removal with an ammoniated solution may result in a small amount of ammonia in the gas stream. Thus, ammonia is present in low concentrations in the gas stream following contacting with the ammoniated solution, i.e. the gas stream is enriched in ammonia.

A solution comprising ammonia, $NH_3$, and an ammoniated solution, as used for example in the carbon dioxide capture section for removal of carbon dioxide from a process gas according to the present disclosure, may be any type of liquid containing ammonia, such as a liquid solution, especially an aqueous solution. The ammonia in the ammoniated liquid may e.g. be in the form of ammonium ions and/or dissolved molecular ammonia. The ammoniated solution is typically aqueous and may be composed of, for example, water, ammonia, ammonium carbonates and derivatives thereof.

"Ammonia rich gases" should herein be understood as gases containing an ammonia portion. The ammonia rich gases may be derived from chemical reactions within the ammonia-soda process. More specifically, the ammonia rich gases may be derived from a chemical reaction in which sodium bicarbonate is produced. The ammonia rich gases may also be derived from an absorption step or device/unit within the ammonia-soda process.

It should be understood that the terms "depleted", "lean", "rich" and "enriched" as used herein are to be interpreted as relative terms, and not as absolute terms. Thus, when a liquid or gas is described as "depleted" or "lean" in a certain component, this implies that the liquid has a decreased content in that certain component as compared to the content prior to the process stage causing the depletion. Similarly, when a liquid or gas is described as "rich" or "enriched" in a certain component, this implies that the liquid has an increased content in that certain component as compared to the content prior to the process stage causing the enrichment.

in some embodiments, the carbon dioxide rich gas stream generated in the carbon dioxide capture process of the integrated method, or the carbon dioxide capture system of the integrated plant, has a carbon dioxide content of more than 80% by weight, such as more than 90% by weight, such as more than 95% by weight, such as more than 99.5% by weight, such as more than 99.95% by weight.

In some embodiments, the carbon dioxide rich gas stream generated in the carbon dioxide capture process of the integrated method, or the carbon dioxide capture system of the integrated plant, has an absolute pressure in the range of from about 8 bar to 25 bar. This high pressure carbon dioxide rich gas thus reduces the power demand for compressing operations.

FIG. 1 is a schematic representation of a carbon dioxide capture system 100 according to prior art, essentially a system as described in WO 2006/022885. Flue gas from a combustion or an industrial process containing residual contaminants, $CO_2$ and inert gas species is via duct 101 forwarded to a cooling arrangement 102. The $CO_2$ concentration of the gas is typically 9-15% for coal combustion and 3-4% for natural gas combustion. Before being fed to the cooling arrangement 102, the gas stream may optionally pass one or more conventional air pollution control systems (not shown). A conventional air pollution control system may, depending on the source of the gas, include a dust collector, a device for $NO_x$ and $SO_2$ control, an acid mist capturing device, a sulfur dioxide removal device, sometimes referred to as a Flue Gas Desulfurization system (FGD) etc.

The cooling arrangement 102 is a series of one or more Direct Contact Coolers (DCC:s), in which cold water forwarded via ducts 110 and 111, is used to wash and scrub the flue gas, capture its residual contaminants and lower its moisture content. The flue gas entering the DCC(:s) is typically water saturated, or above saturation in the case of dry FGD, and in the temperature range of 40-85° C.

The resulting cooled flue gas is via duct 103 supplied to the $CO_2$ absorber 104. 20 The $CO_2$ absorber 104 may comprise a series of absorption sections, depending on the removal efficiency required and the operating conditions of the plant. $CO_2$ is captured from the flue gas by absorption into a cooled $CO_2$-lean ammoniated solution, supplied via pipe 113 from a regenerator 115 and via pipe 112 from an ammonia water stripping column 128 to the absorber 104. The $CO_2$-rich stream withdrawn via pipe 114 from the bottom of the absorber 104 is an ammoniated solution enriched in $CO_2$ and is sent to the regenerator 115.

The regenerator 115 operates at high pressure and elevated temperature. The pressure of the ammoniated solution fed to the regenerator is elevated using a high pressure pump (not shown). The lower part of the regenerator 115 has a comparatively higher temperature due to the heat-exchanging with steam supplied via duct 117 than do the upper part of the regenerator 115 due to heat-exchanging with a cooling medium 118. The high pressure and high temperature in the regenerator cause the release of high-pressure gaseous $CO_2$. Before being forwarded to compressor 121 via duct 120, the $CO_2$ stream may be cooled by heat-exchanging with a cooling medium 118 in the regenerator. Following compression in compressor 121, the $CO_2$ stream is forwarded via duct 122 to a heat-exchanger 123 for cooling with a cooling medium. The resulting compressed and cooled $CO_2$ stream 124 is sent to storage.

The clean gas with low $CO_2$ concentration (lean gas) containing a minor amount of ammonia is via pipe 105 passed to a water wash vessel 106 for ammonia removal. A cold lean water solution is via pipe 131 supplied to the water wash vessel 106 after being cooled in heat-exchanger 132. The resultant solution enriched in ammonia is via pipe 125, after having passed heat-exchanger 126, sent for cleaning in an ammonia water stripping column 128. The lower part of the ammonia water stripping column 128 has a comparatively higher temperature due to the heat-exchanging with steam supplied via duct 133 than do the upper part of the ammonia water stripping column 128 due to heat-exchanging with a cooling medium supplied via pipe 135 and withdrawn via pipe 134.

The clean gas now depleted in both $CO_2$ and ammonia is via duct 107 forwarded to one or more Direct Contact Heater(s) (DCH) 108, which is/are operative for further cleaning and heating of the gas stream and for releasing a heated gas stream via duct 109 to the atmosphere. A heated liquid stream, supplied via pipe 110, preferably recycled from the DCC(s) 102, is used for heating the gas stream in the DCH.

Figure 2:
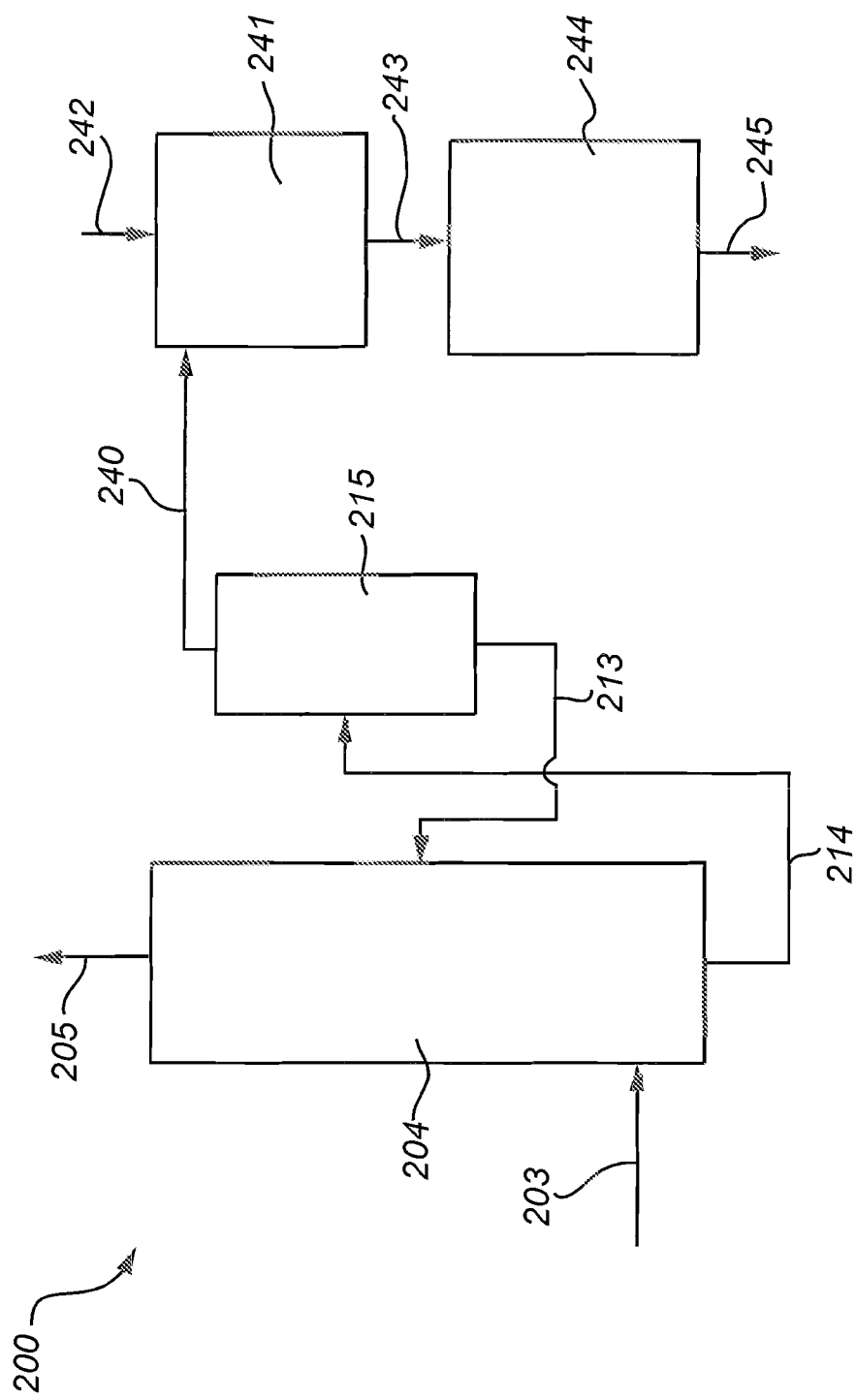
FIG. 2 is a schematic representation depicting one example of an integrated plant according to the present invention.
Figure 3:
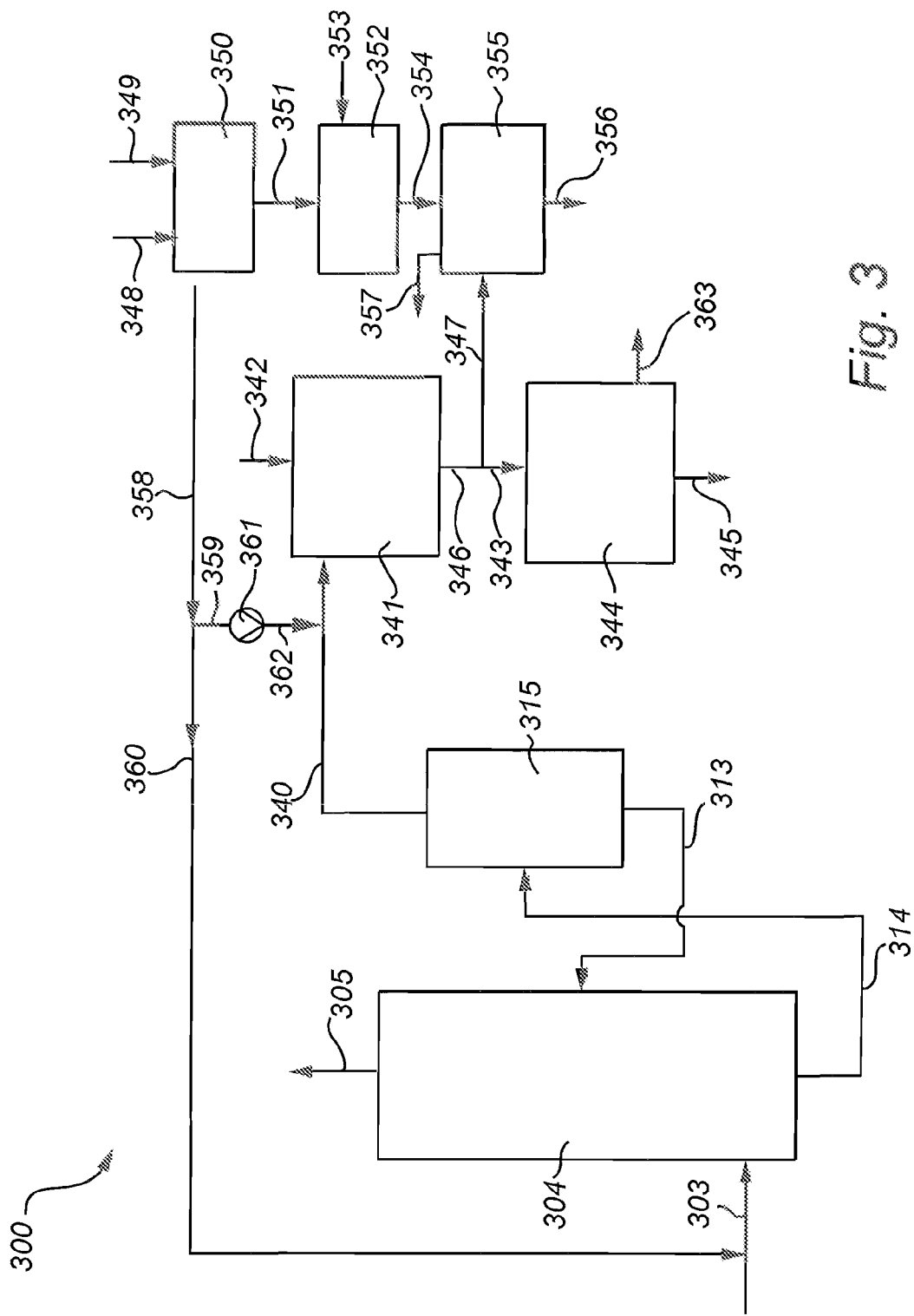
FIG. 3 is a schematic representation depicting one example of an integrated plant according to the present invention.
Figure 4:
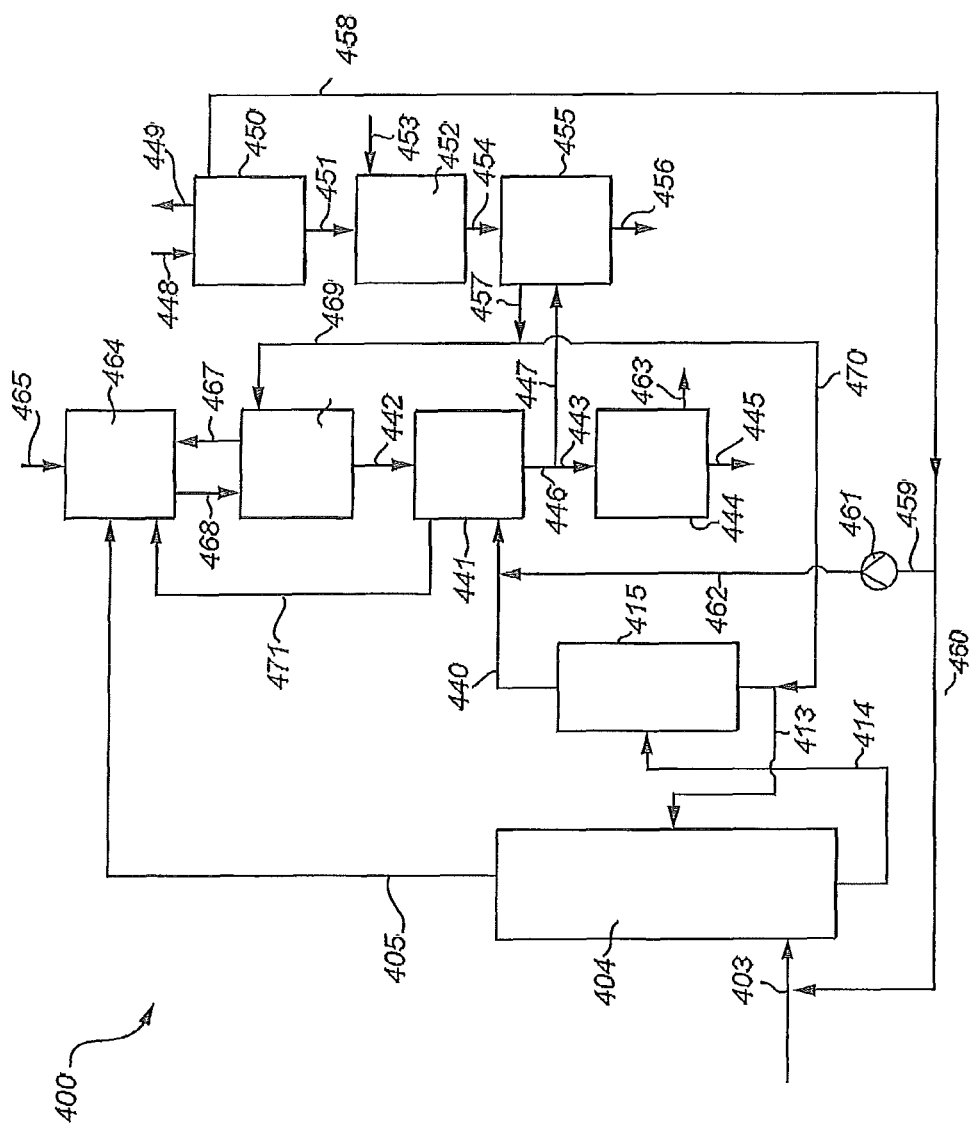
FIG. 4 is a schematic representation depicting one example of an integrated plant according to the present invention.

With reference to FIGS. 2-4, specific examples of an integrated plant 200, 300, 400 according to the present invention will now be discussed. Process gas 203, 303, 403, is forwarded to a $CO_2$ absorber, or absorption unit, 204, 304, 404 for capture of $CO_2$ from the process gas. In the absorber 204, 304, 404, process gas is brought into contact, e.g. in a counter-current flow mode, with an ammoniated solution, supplied via pipe 213, 313, 413. $CO_2$ is captured into the ammoniated solution. Having passed the absorber 204, 304, 404, the resulting process gas is depleted in $CO_2$, and optionally enriched in ammonia. This gas stream depleted in carbon dioxide is withdrawn via duct 205, 305, 405. The absorber 204, 304, 404 may for example function essentially as described in relation to FIG. 1.

The resulting $CO_2$ enriched slurry or solution 214, 314, 414 is passed, for example by means of a high pressure pump (not shown), from the absorber(s) 204, 304, 404 to a regenerator 215, 315, 415. The resulting process gas stream from which carbon dioxide has been removed, i.e. the gas stream depleted in carbon dioxide, is withdrawn from the absorber 204, 304, 404 via duct 205, 305, 405.

High pressure and high temperature in the regenerator causes the release of high-pressure gaseous $CO_2$ from the ammoniated solution. The $CO_2$ lean ammoniated solution resulting there from is forwarded for reuse in the $CO_2$ absorber 204, 304, 404 via pipe 213, 313, 413. Prior to being fed to the absorber 204, 304, 404, the $CO_2$ lean ammoniated solution may be cooled (not shown).

The regenerator 215, 315, 415 operates at high pressure and elevated temperature. The highly concentrated and high-pressure $CO_2$ being released from the ammoniated solution is withdrawn from the regenerator 215, 315, 415, via duct 240, 340, 440, and forwarded to a carbonator 241, 341, 441 configured to bring the carbon dioxide rich gas stream into contact with ammoniated brine, supplied via pipe 242, 342, 442. The contacting may be performed in a counter-current flow mode such that the gas enters the carbonator at one end (typically at the bottom) and the liquid solution enters the carbonator at the other end (typically at the top). The carbon dioxide rich stream may for example bubble up through the ammoniated brine and the resulting product, sodium bicarbonate, may precipitate out of a resulting ammonium chloride solution.

Such a carbonator 241, 341, 441 is an example of a piece of equipment forming part of an ammonia-soda system. The duct 240, 340, 440 configured to forward the $CO_2$ rich gas stream to the ammonia-soda system is one example of a duct forming part of an integration circuit according to the present invention.

Sodium bicarbonate generated in the carbonator 241, 341, 441 is via pipe 243, 343, 443 forwarded to a calcinator 244, 344, 444 being configured to convert the sodium bicarbonate to sodium carbonate by heating (calcination). This conversion may further generate water, ammonia and/or carbon dioxide. The resulting sodium carbonate is withdrawn from the calcinator 244, 344, 444 via pipe 245, 345, 445. Such a calcinator 244, 344, 444 is an example of a piece of equipment forming part of an ammonia-soda system.

At least an absorber(s), as exemplified by 204, 304, 404, and a regenerator, as exemplified by 215, 315, 415, may constitute parts of a carbon dioxide capture process, or system, according to the method or plant as herein described. This carbon dioxide capture system may also be referred to as a carbon dioxide capture arrangement. The process taking place in the carbon dioxide capture system may for example correspond to a part of a so-called chilled ammonia process ("CAP"), for example a part of a process as essentially described in WO 2006/022885.

At least a carbonator, as exemplified by 241, 341, 441, and a calcinator, as exemplified by 244, 344, 444, may constitute parts of an ammonia-soda system of the present plant. The ammonia-soda system may also be referred to herein as an ammonia-soda arrangement. The process taking place in the ammonia-soda system may for example be parts of a Solvay process or a variant thereof.

The carbon dioxide rich gas stream is forwarded directly from the regenerator, for example as depicted by 215, 315, 415 in the Figures, of the carbon dioxide capture process, or system, to the carbonator, for example as depicted by 241, 341, 441, of the ammonia-soda process, or system. No intermediate process operation is needed between the two processes or systems. The carbon dioxide rich gas may thus without being subjected to further process operations be forwarded to the carbonator via a duct of the integration circuit. For example, no compression of the gas has to be performed prior to forwarding the carbon dioxide rich gas stream to the ammonia-soda system. The overall compressor demand is thus reduced as compared to compressor demand for stand alone low pressure carbon dioxide capture systems as well as stand alone ammonia-soda systems.

Since $NH_3$, as well as $CO_2$, is rather volatile, $CO_2$ removal may typically be performed at a reduced temperature, in order to reduce the loss of $NH_3$ from the ammoniated solution to the gas stream in the absorber. Also, the removal/absorption of $CO_2$ from the gas stream by the ammoniated solution may be an exothermic reaction. The part of the integrated plant referred to as the carbon dioxide capture system may thus moreover comprise one or more coolers, such as one or more DCC(:s), configured to cool the process gas stream to a temperature convenient for $CO_2$ removal and optionally also for condensing water from the process gas stream. Examples of such DCC:s are depicted and described in relation to FIG. 1. When present, such a cooler may be configured to cool the gas stream to a temperature of less than 20° C. prior to passing the process gas stream to carbon dioxide removal in the absorber.

The integrated plant according to the present invention may furthermore comprise a limestone kiln, for example as depicted by 350 and 450 in FIGS. 3 and 4. In the limestone kiln 350, 450, limestone supplied via pipe 348, 448, is converted to calcium oxide and a diluted carbon dioxide process gas, for example by bringing the limestone into contact with coke, optionally supplied via pipe 349, 449. A limestone kiln 350, 450 is a further example of a piece of equipment comprised in an ammonia-soda system.

Calcium oxide generated in the limestone kiln 350, 450 is passed to a limer 352, 452 being configured to receive calcium oxide and combine it with water, supplied via pipe 353, 453. A limer 352, 452 is a further example of a piece of equipment that may be comprised in an ammonia-soda system.

The generated diluted carbon dioxide process gas may in one embodiment exit the limestone kiln 350, 450 via duct 358, 458. One portion of the carbon dioxide lean gas may be distributed via duct 359, 459 to a compressor 361, 461, configured to compress the carbon dioxide lean gas and to generate a compressed carbon dioxide gas which via ducts 362, 462, and 340, 440 is forwarded to the carbonator 341, 441.

Another portion of the diluted carbon dioxide process gas generated in a limestone kiln of the ammonia-soda system may furthermore be forwarded to the absorber of the carbon dioxide capture system. A duct of the integration circuit may be configured to forward a portion of the diluted carbon dioxide process gas to the absorber. Thus, the diluted carbon dioxide process gas not needed for sodium carbonate production may be forwarded to the carbon dioxide capture system where it may used as the sole feed of process gas to the absorber. In such a case, no external feed of process gas is needed. Alternatively, the diluted carbon dioxide process gas may used in addition with a process gas provided from an external source, such as from a plant boiler. This may reduce the amount of diluted carbon dioxide process gas being compressed in the ammonia-soda system, and the power demand of the plant may thus be reduced. The portion of diluted carbon dioxide process gas forwarded to the absorber may partially or completely replace process gas supplied from an external source.

Supply of a portion of carbon dioxide lean gas to the absorber of the carbon dioxide capture system is exemplified by ducts 360, 460 in FIGS. 3 and 4. With reference to FIGS. 3 and 4, the hot ammonium chloride generated in the carbonator 341, 441 may via pipe 347, 447 be passed to an ammonia stripper 355, 455 being configured to generate a solution containing ammonia that may be withdrawn via pipe 357, 457. The ammonia stripper 355, 455 may moreover receive a solution comprising calcium oxide from the limer 352, 452, supplied via pipe 354, 454. Waste water and any calcium containing components are withdrawn via pipe 356, 456. The ammonia stripper 355, 455 is an example of a piece of equipment that may be comprised in an ammonia-soda system.

The ammonia-soda system of the plant may moreover comprise an ammonia scrubber configured to receive the gas stream depleted in carbon dioxide and enriched in ammonia generated in the absorber of the carbon dioxide capture system and forwarded directly from the absorber to the ammonia scrubber of the ammonia-soda system. Such forwarding may be carried out via a duct of the integration circuit. The gas stream depleted in carbon dioxide and enriched in ammonia may thus be treated along with other ammonia rich gases generated in the ammonia-soda system. Equipment such as DCH(s), water wash vessels and stripper vessels that are normally present in conventional carbon dioxide capture systems are thus not needed in the integrated system according to this embodiment.

One example of a duct 405 configured to forward the gas stream depleted in carbon dioxide and enriched in ammonia generated in the absorber is depicted in FIG. 4, wherein one example of an ammonia scrubber 464 is also depicted.

In addition, to scrubbing the gas deriving from the absorber, the ammonia scrubber 464 may be configured to receive other ammonia rich gases generated in ammonia-soda system, such as in the carbonator 441. Such gases may via duct 471 be forwarded to the ammonia scrubber 464. The ammonia rich gases are scrubbed in the ammonia scrubber 464 by bringing them into contact with a wash solution, such as a brine solution, i.e. an aqueous solution containing sodium chloride, supplied via pipe 465.

Resulting ammonia and brine solution is via pipe 468 passed to an ammonia absorber 472 of the ammonia-soda system. The ammonia absorber 472 is configured to receive solution containing ammonia via pipe 468 from the ammonia scrubber 464 and via pipe 469 from the stripper 455. Ammoniated brine generated in the ammonia absorber 472 is passed to the carbonator 441 via pipe 442. Any ammonia rich gas resulting from the ammonia absorber 472 may via pipe 467 be forwarded to the ammonia scrubber 464.

The carbon dioxide capture system may further utilize ammonia from the ammonia-soda as make-up ammonia. This thus reduces the need for addition of external ammonia as make-up ammonia. Ammonia for the carbon dioxide removal step in the absorber may instead be found within the plant and further utilized as make-up ammonia. Piping supplying make-up ammonia, in gaseous or liquid form, to the absorber may form part of an integration circuit between the two systems. This is for example depicted in FIG. 4, wherein solution containing ammonia generated in the stripper 455 of the ammonia-soda section may be passed to the absorber 404 of the carbon dioxide capture section via pipes 470 and 413. Some make-up ammonia might nevertheless be supplied, from an external source to the ammonia-soda system.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for producing sodium carbonate, comprising integrating a carbon dioxide capture process with an ammonia-soda process,
    wherein the carbon dioxide capture process comprises:
        providing a process gas stream containing carbon dioxide;
        removing the carbon dioxide from the process gas stream by bringing the process gas stream into contact with a carbon dioxide-lean ammoniated solution in an absorption unit to allow absorption of the carbon dioxide into the carbon dioxide-lean ammoniated solution to generate a solution enriched with carbon dioxide and a gas stream depleted in carbon dioxide and enriched in ammonia; and
        removing the carbon dioxide from the solution enriched with carbon dioxide by desorption in a regeneration unit to generate a carbon dioxide rich gas stream and the carbon dioxide-lean ammoniated solution,
    and the ammonia-soda process comprises:
        forwarding the carbon dioxide rich gas stream from the regeneration unit to a carbonator for reacting the carbon dioxide rich gas stream with an ammoniated brine solution to generate sodium bicarbonate, and converting the sodium bicarbonate to sodium carbonate; and forwarding a fluid containing ammonia generated in the ammonia-soda process as make-up ammonia to the absorption unit for removing the carbon dioxide from the process gas stream.

2. The method according to claim 1, wherein the ammonia-soda process further comprises providing the gas stream depleted in carbon dioxide and enriched in ammonia derived directly from the carbon dioxide removal step to an ammonia scrubber of the ammonia-soda process; and contacting the gas stream depleted in carbon dioxide and enriched in ammonia with a wash solution in the ammonia scrubber to generate a gas depleted in ammonia and the ammoniated brine solution.

3. The method according to claim 1, wherein the process gas stream comprises at least a portion of diluted carbon dioxide process gas generated in the ammonia-soda process.

4. The method according to claim 2, wherein the wash solution of the ammonia scrubber is an aqueous solution containing sodium chloride.

* * * * *